United States Patent

Ordo et al.

[11] Patent Number: 5,009,116
[45] Date of Patent: Apr. 23, 1991

[54] POWER TRANSMISSION

[75] Inventors: James P. Ordo, Plainfield; James A. Raszkowski, Indianapolis; Donald Klemen, Carmel, all of Ind.

[73] Assignee: General Motors Corporation, Detroit, Mich.

[21] Appl. No.: 502,195

[22] Filed: Mar. 30, 1990

[51] Int. Cl.$^5$ .............................................. F16H 3/08
[52] U.S. Cl. ........................................ 74/331; 74/330
[58] Field of Search ................... 74/330, 331, 333, 745

[56] References Cited

U.S. PATENT DOCUMENTS

| 4,776,227 | 10/1988 | Janiszewski | 74/331 |
| 4,831,894 | 5/1989 | Braun | 74/745 |
| 4,876,924 | 10/1989 | Fletcher et al. | 74/745 |

Primary Examiner—Allan D. Herrmann
Assistant Examiner—William Trousdell
Attorney, Agent, or Firm—Donald F. Scherer

[57] ABSTRACT

A power transmission has a housing comprised of an end support, a casing, an end cover, a converter housing, an input shaft, an output shaft and a pair of identically dimensional countershafts. A bushing and oil feed sleeve are positioned on each end of each countershaft for cooperating with the end support connecting the housing for alignment therebetween and with the casing for alignment therebetween. Each countershaft has a pair of ratio gears rotatably disposed thereon and meshing with respective output gears rotatable with the output shaft and a friction clutch is provided for each ratio gear. Four of the friction clutches which are disposed on the countershafts are identical in construction. A fifth clutch assembly, in line with the input shaft, can be shortened, if desired, by the elimination of one friction plate and one reaction plate. Each clutch has an apply piston which cooperates with respective lube passages formed in the shaft to control lubricant and cooling flow to each respective clutch during engagement. A reverse gear pair has one gear member connectible to one countershaft by a synchronizer clutch and one of the friction clutches and the other gear member drivingly connected with a ratio gear on the other countershaft. A park pawl secured to one of the reverse gear members is provided to obtain a park gear having a torque ratio greater than one with the output shaft thereby providing improved disengagement loading in the park system.

3 Claims, 8 Drawing Sheets

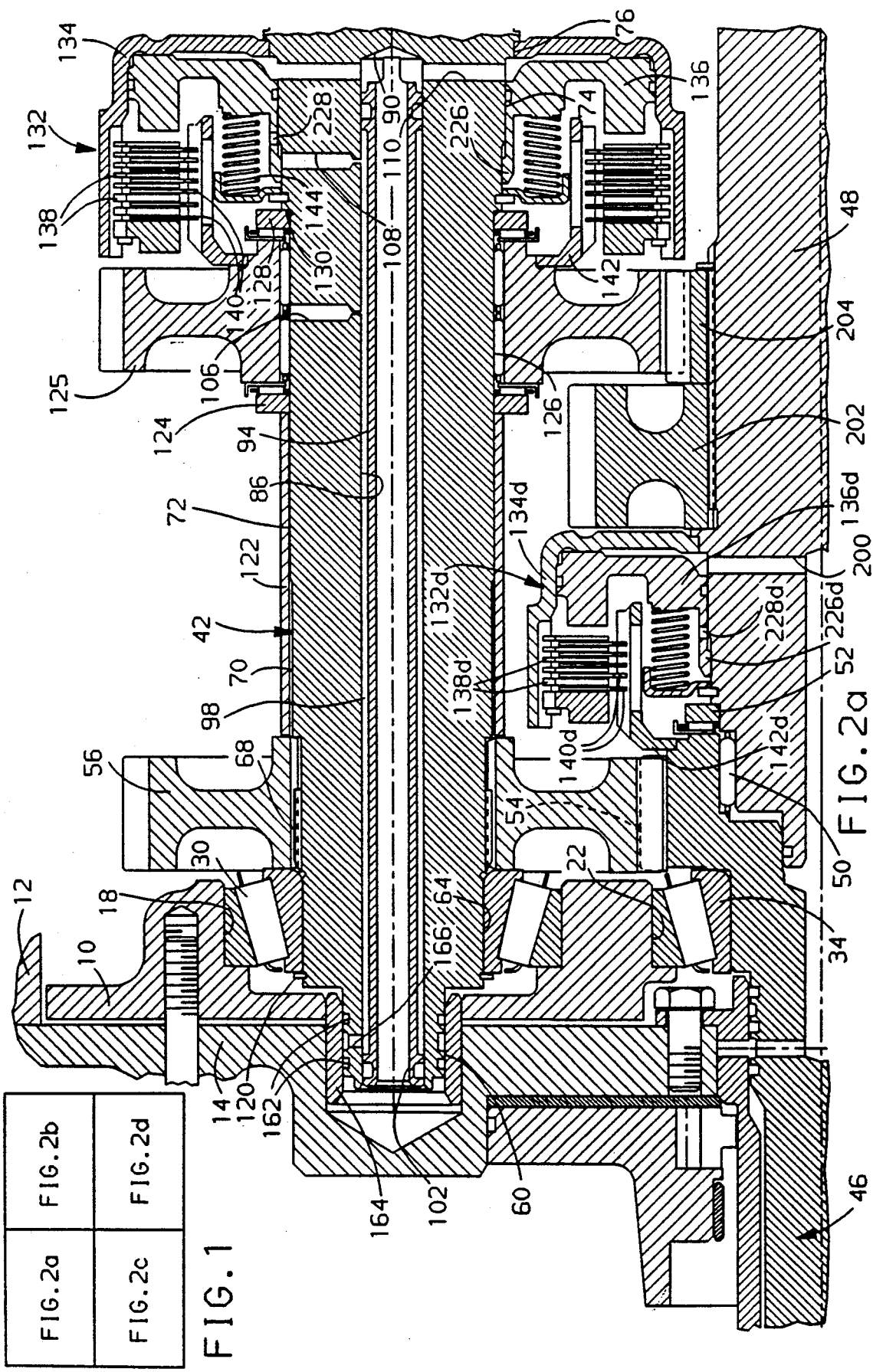

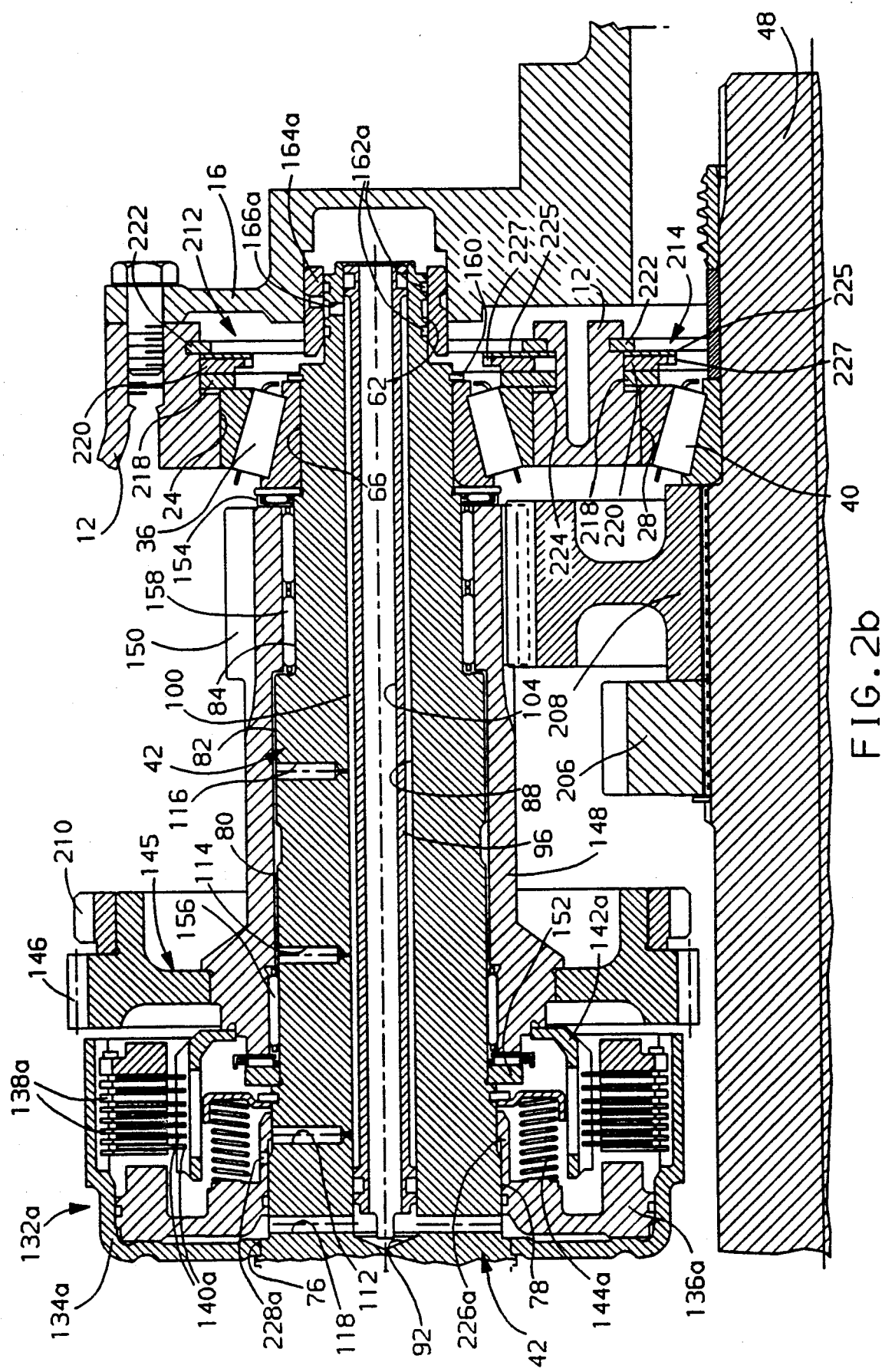

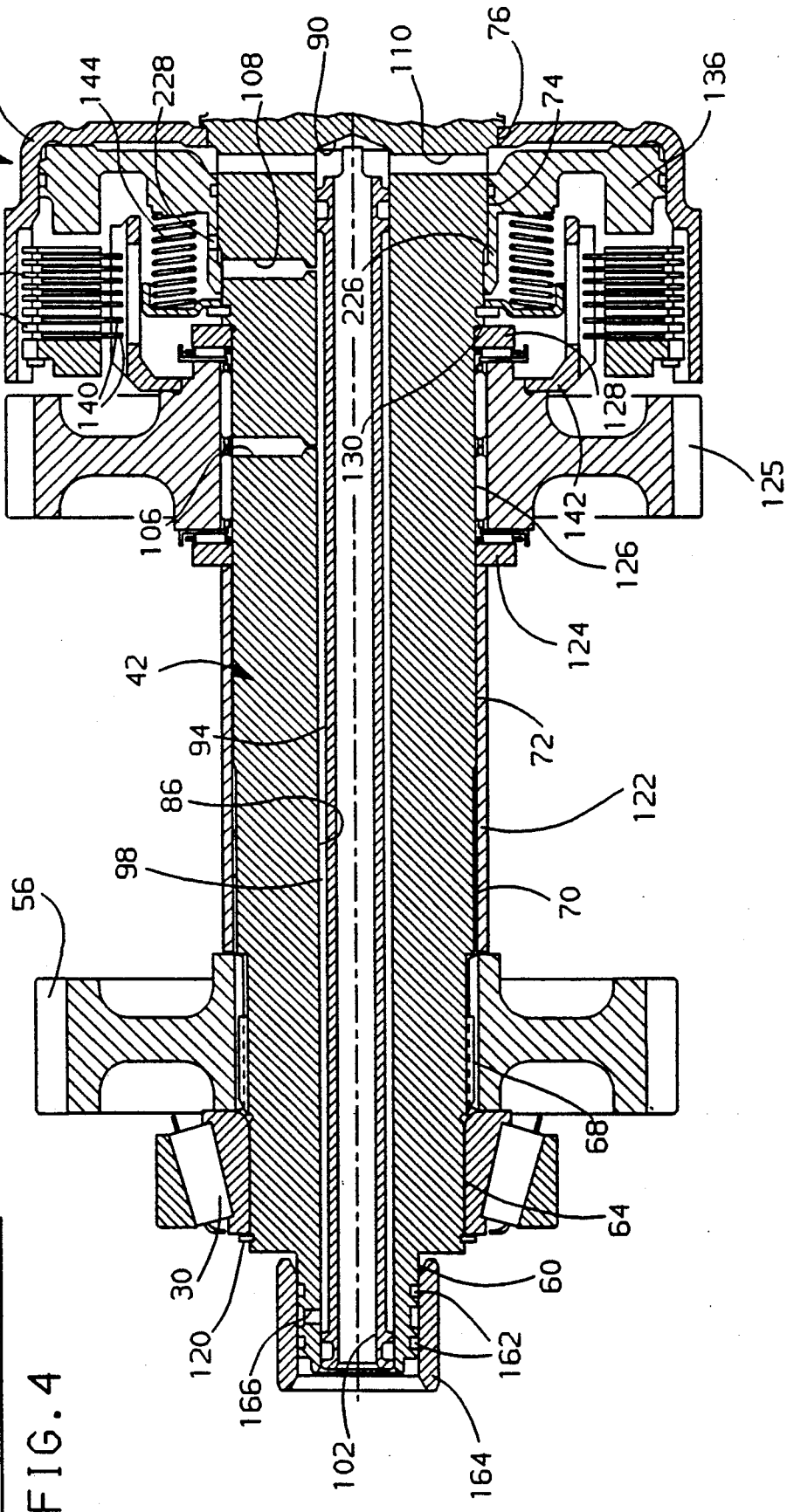

POWER TRANSMISSION

BACKGROUND OF THE INVENTION

This invention relates to power transmissions and more particularly to power transmissions having multiple countershafts.

Power transmissions with multiple countershafts generally have a housing assembly formed with at least two members that are aligned by dowel pins. These members generally include a casing and an end cover or bell housing. The bell housing generally encloses a torque converter or friction clutch. The countershafts are supported in the casing at one end and in the end cover at the other end. The input shaft is generally supported in the end cover and the output shaft is supported in the casing.

The alignment and parallelism of the shafts is determined by the doweling between the casing and cover and the bearing bores in each of the casing and end cover. The machining of the required dowel and bearing bores is subject to manufacturing tolerances which must be held within close limits for quiet, efficient and durable operation of the transmission. As is well known, close tolerance machining adds to the overall cost of the product.

Also, prior art transmissions use a separate axis for the idler gear in the reverse gear ratio. The preparation of the structure for the idler gear requires additional machining and support material within the casing member of the housing assembly. The overall cost is again affected by the need for this added material, machining and the complexity of the casing casting. The use of a reverse gear idler on a separate axis also affects the numerical value of the reverse ratio making it difficult to provide a reverse ratio equal to the forward low ratio.

SUMMARY OF THE INVENTION

The present invention seeks to overcome many of the disadvantages known in multiple countershaft prior art transmissions. The present invention has an input shaft, two countershafts and an output shaft. Gear members are rotatably supported on the countershafts and are selectively connectible therewith through hydraulically operated friction clutches. Each of the countershafts are identical in physical dimensions, that is, they have identical length, diameters, cross drilled and longitudinally drilled holes. Each of the clutch assemblies is identical and includes a housing, which is secured to the shaft by welding, a piston, which is slidably disposed on the shaft and within the housing, a plurality of friction discs alternately splined to the housing and to an output hub and a return spring assembly. Each of these individual items are identical within the clutch assembly reducing the number of inventory parts and part selection necessary during manufacturing of the countershaft assemblies. Each countershaft assembly is comprised of two centrally located clutch assemblies, a head gear member splined thereto, ratio gear members rotatably supported thereon and bearing members for supporting the gear members. Each countershaft has pressfit thereon a pair of tapered roller bearings. Two end extensions, one formed on each countershaft for the purpose of engaging a dowel-seal ring sleeve which provides dowel alignment at assembly, machining datums and passages for lubrication fluid during transmission operation. The output hub is secured generally by welding with the respective gear member.

While each of these clutches affects the establishment of a separate gear ratio, they are identical in structure. One of the clutches is effective to establish both a forward ratio other than low, for example, third, and the reverse drive ratio. The selection of the ratio to be established by this particular friction clutch, is through the manipulation of a synchronizer. Thus, a synchronized reverse operation is obtained.

The reverse gear ratio is obtained by one reverse gear member being clutchable to one of the countershafts and another gear member rotatably secured to a forward drive ratio gear, preferably the low ratio gear. Thus, the engagement of the one friction clutch will establish the reverse ratio, while the engagement of a second friction clutch will establish the low ratio. This permits what is known as a rock cycle to assist in extracting the vehicle from a stuck location, such as in the snow or mud.

The numeric value of the low forward ratio and the reverse ratio are identical. Gearing is mounted on the countershafts by roller bearings and thrust bearings, and as previously mentioned, is connectible thereto through the operation of friction clutches. Each countershaft has a member of a head gear set splined thereto, which meshes with the head gear on the input shaft which is rotatably supported in an end support. The output shaft has one of the friction clutch members secured thereto for operation of a direct drive between the input shaft and the output shaft.

The end support in which the input shaft is rotatably supported also has bearing locations for the countershafts. The end support plate, after securement to the bell housing, will permit the assembly of the countershafts, the input shaft and the output shaft, in a vertical orientation, prior to the outer casing being installed on the transmission. Thus, as the transmission progresses along the assembly line, visual or automated inspection of the various components on the shafts and their relationship with other portions of the transmission is always possible.

Each countershaft has a pair of longitudinal fluid passages in which is disposed a distribution tube to separate fluid flow into a central longitudinal passage and an annular longitudinal passage. The center of the distribution tube is subjected to high pressure fluid whenever clutch engagement is desired and the annular space between the distribution tube on the shaft is supplied with lube fluid which is conducted to the bearings and cooling fluid which is supplied to the clutches during engagement. The supporting structure of the shaft and the end cover or support member also includes a bushing, which provides for a doweling and seal ring sleeve structure between the countershaft, the end support and a bell housing or transmission housing. This combined dowel pin seal ring sleeve ensures dowel pin alignment between the components and provides fluid passages to supply the various fluids to the longitudinal passages in the countershaft. The seal arrangement and passages are disposed to direct any leakage from the clutch feed circuit to the lube circuit. This contributes to an increase in the overall efficiency of the unit and a reduction in the size requirement of the supply pump.

Each of the clutch pistons slidably engages the respective countershaft as previously mentioned. Each piston has an inner annular skirt portion which partially covers the cooling passage in the countershaft for the respective clutch. The skirt cooperates with the cooling passages in the shaft to provide a flow restriction to limit the amount of fluid flow distributed to the clutch whenever the clutch is not engaged. During engagement, the sleeve is moved sufficiently to permit a secondary hole in the sleeve to allow full cooling flow from the longitudinal passage in the countershaft to the clutch plates to assist in maintaining the internal temperature of the clutch discs at or below the desired level.

The cooperation between the piston skirt and the countershaft eliminates the need to drill precision holes (i.e. flow restricting orifices) within the countershaft to control the flow of cooling fluid which might otherwise be required to reduce the cooling flow requirements of the transmission hydraulic system.

It is an object of this invention to provide an improved power transmission wherein a pair of countershafts are rotatably supported in an end cover and have gears disposed thereon meshing with respective gears on an input shaft and an output shaft, and further wherein the gears are selectively connectible with the countershafts to provide a plurality of forward ratio gears and a reverse gear ratio with said reverse gear ratio being provided by one gear member which is rotatably mounted on one of said countershafts and connectible therewith by a friction clutch, meshing with another gear which is rotatably mounted on the other countershaft and drivingly connected to the output through the ratio gear set which provides the lowest forward gear ratio.

It is another object of this invention to provide an improved power transmission substantially as described above for the preceding object, wherein a synchronizer clutch is provided to establish a drive connection between the reverse gear member on the one countershaft and another of the ratio gears on said countershaft wherein selective operation of the friction clutch and the synchronizer permit the operation of either the reverse gear ratio or a forward gear ratio.

It is a further object of this invention to provide an improved power transmission having a pair of parallel countershafts, an input shaft and an output shaft substantially as described above for the preceding objects, wherein the reverse drive ratio and the forward low drive ratio have the same numerical value.

It is still a further object of this invention to provide an improved power transmission having a pair of parallel countershafts supported in an end plate and in a transmission housing wherein each of the countershafts has a reverse gear member rotatably supported on a respective countershaft, and wherein one of the reverse gear members has secured thereto a parking gear arrangement which is connectible to the output shaft through the low gear ratio gear set such that a torque ratio greater than one is provided thereby reducing the loading on the park mechanism.

It is yet a further object of this invention to provide an improved transmission substantially as defined in the preceding object, wherein the synchronizer assembly is provided to selectively connect the output hub member of the friction clutch assembly with a reverse gear train or with a forward gear ratio such that the friction clutch may be selectively engaged in combination with the synchronizer clutch to provide separate gear ratios in reverse and in one forward ratio.

These and other objects and advantages of the present invention will be more readily apparent from the following description and drawings.

Related U.S. Pat. applications filed substantially simultaneously with the application are: U.S. Ser. No. 07/502,194, filed Mar. 30, 1990; U.S. Ser. No. 07/502,196, filed Mar. 30, 1990; and U.S. Ser. No. 07/502,198, filed Mar. 30, 1990, all of which are assigned to the assignee of the present invention.

DESCRIPTION OF THE DRAWINGS

FIG. 1 is a block diagram showing the interconnection of FIGS 2a through 2d.

FIGS. 2a through 2d are cross-sectional elevational views of various components within the power transmission, which when assembled as shown in FIG. 1, will provide a cross-sectional representation of the preferred of the transmission.

FIG. 4 is block diagram showing the positioning of FIGS. 5a and 5b.

FIGS. 5a and 5b, when combined, depict the one typical countershaft assembly with the gearing and clutch members assembled thereto.

DESCRIPTION OF THE PREFERRED EMBODIMENT

Figure 2C:
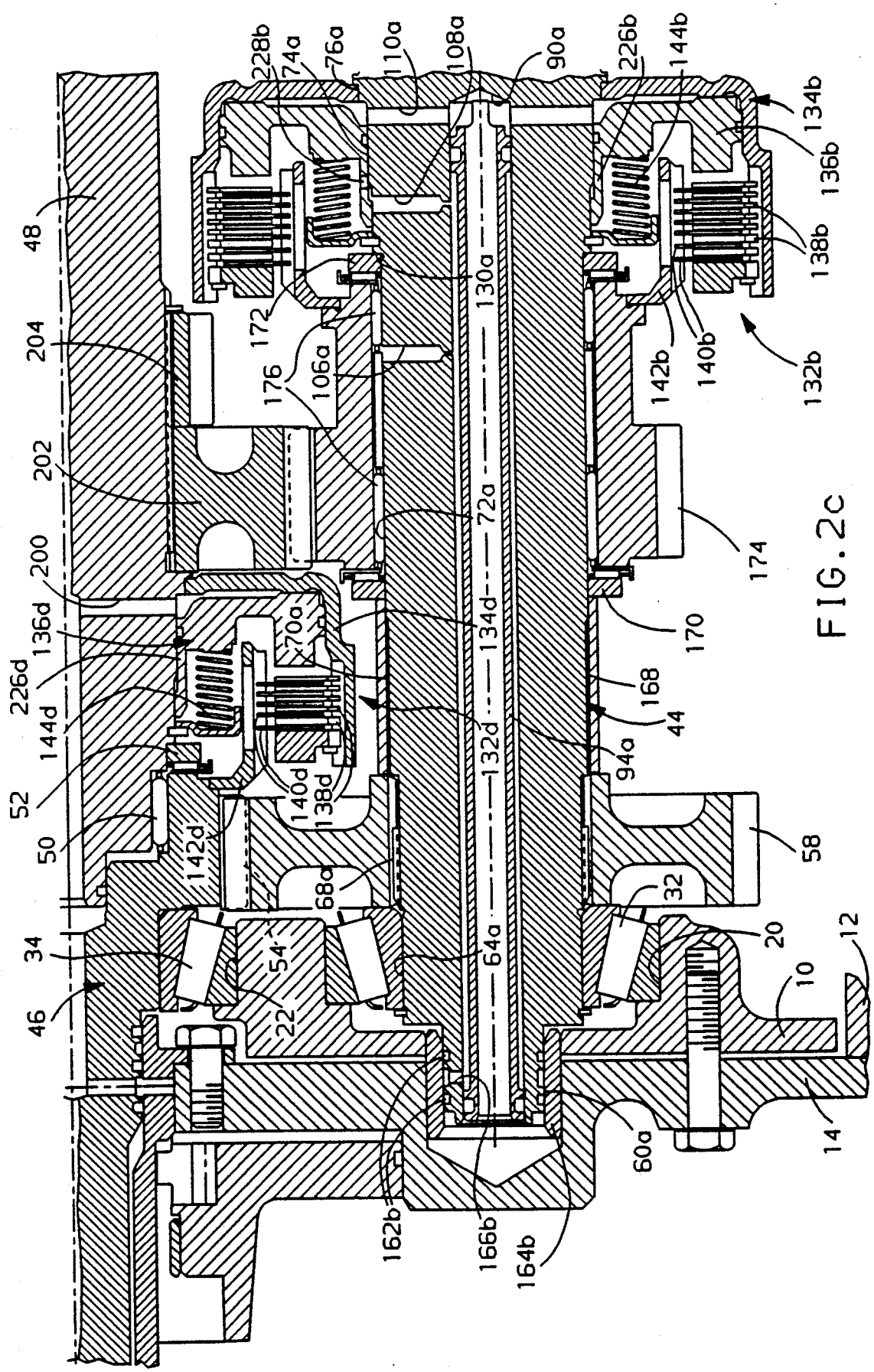
Figure 2D:
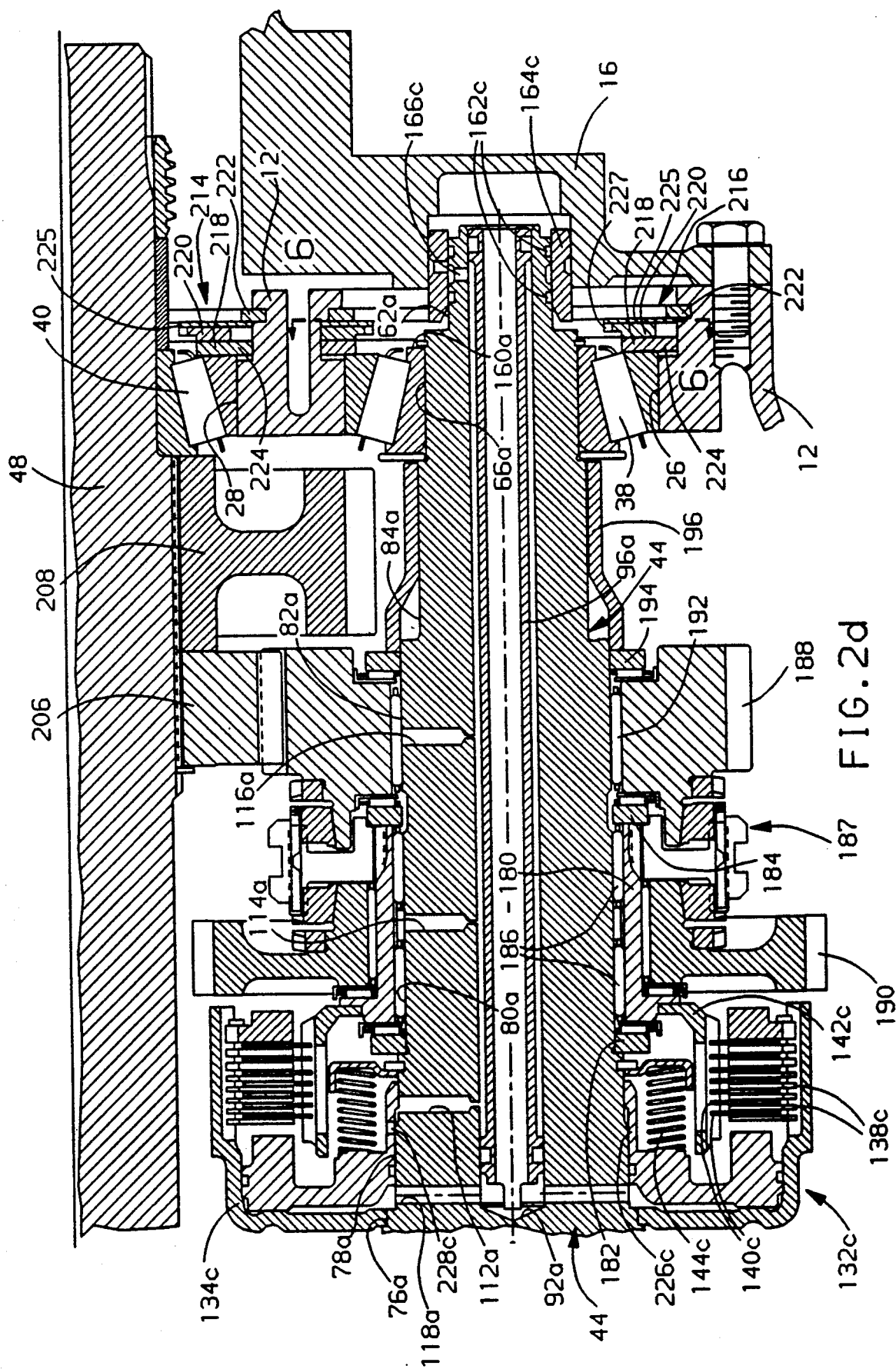
Figure 3:
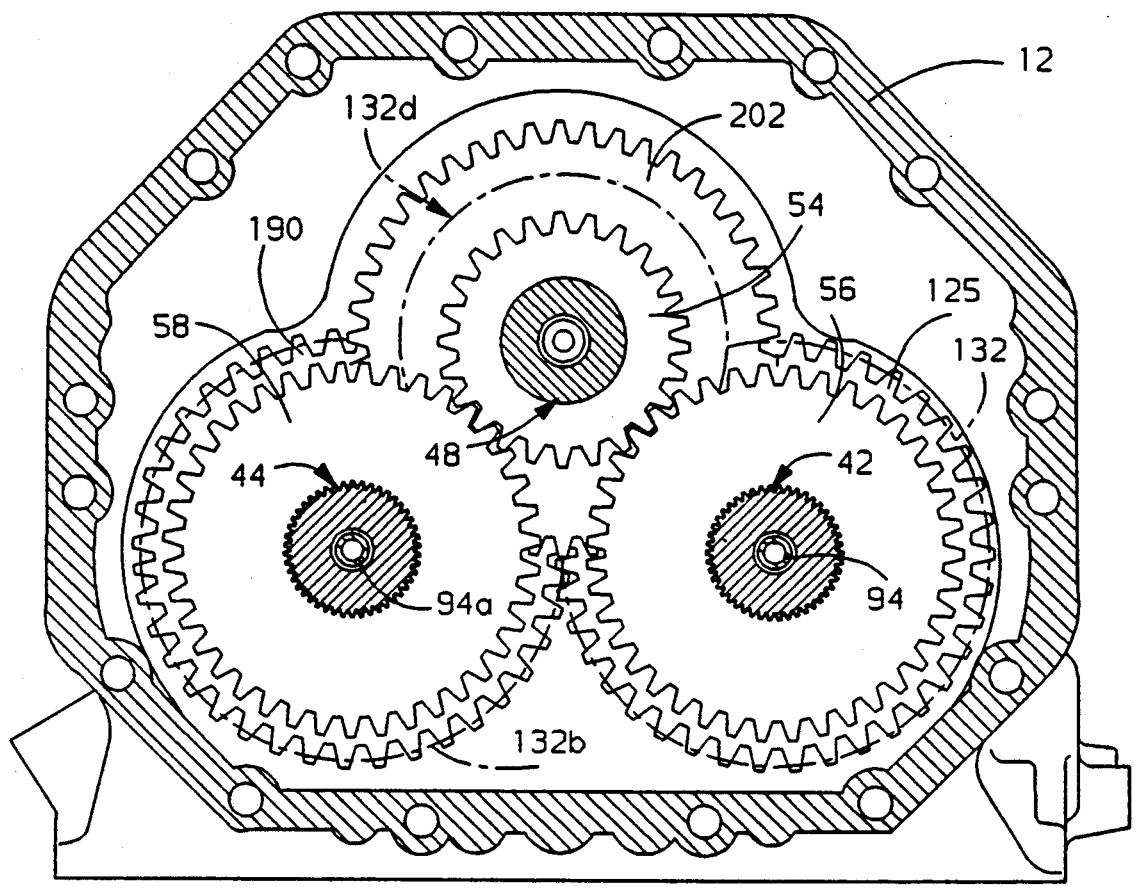
FIG. 3 is an end view of the transmission taken with the end cover removed to show the positioning of the input shaft and the countershafts and some of the gearing within the transmission casing.
Figure 6:
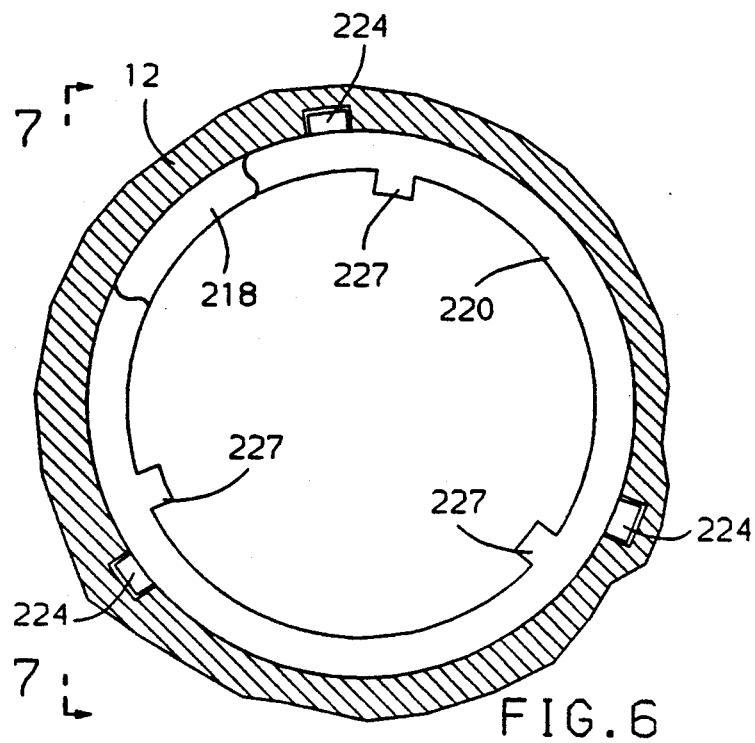
FIG. 6 is an end view taken along line 6—6 of FIG. 2d.
Figure 7:
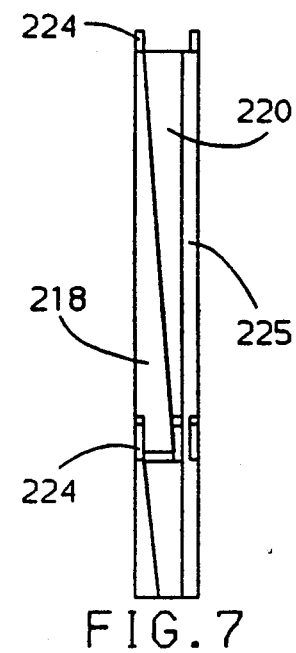
FIG. 7 is a plan view taken along line 7—7 of FIG. 6.

The same characters represent the same or corresponding parts throughout the several views. FIGS. 2a through 2d, when combined as shown in FIG. 1, depict a cross-sectional elevational view of a multiple countershaft power transmission having a multiple piece casing comprised of an end support 10, an outer casing or housing 12, a bell housing or engine mounting member 14 and an end cover 16. The end support 10 is a substantially annular disc member having bearing support recesses 18 and 20 for countershaft members and recess 22 for input shaft support. The casing 12 is located on the bell housing 14 by dowel pins, not shown, and the end cover 16 is located on the casing 12 by dowel pins, not shown.

The housing 12 is a substantially cylindrical member with an annular semi-closed end portion having recesses 24 and 26 formed therein for countershaft bearing support and a recess or opening 28 formed therein for output shaft bearing support. Preferably the bearings 30 through 40 which are disposed in the recesses or openings 18 through 28, respectively, are identical and therefore selection of any particular bearing to be placed in a specific recess or opening is eliminated. The bearings, however, can be of different sizes if the conditions and assembly warrant. The bearings 30 and 36 support a countershaft 42 while the bearings 32 and 38 support a countershaft 44. The bearing 34 rotatably supports and input shaft 46 and the bearing 40 rotatably supports an output shaft 48. The output shaft 48 is also rotatably supported by a needle bearing 50 and a thrust bearing assembly 52 which cooperate with the input shaft 46. In particular, the bearings 50 and 52 cooperate with a head gear 54, which is formed integral with or otherwise secured to the input shaft 46. The head gear 54 meshes with a head gear 56 splined to shaft 42 and a head gear 58 splined to shaft 44.

Figure 5B:
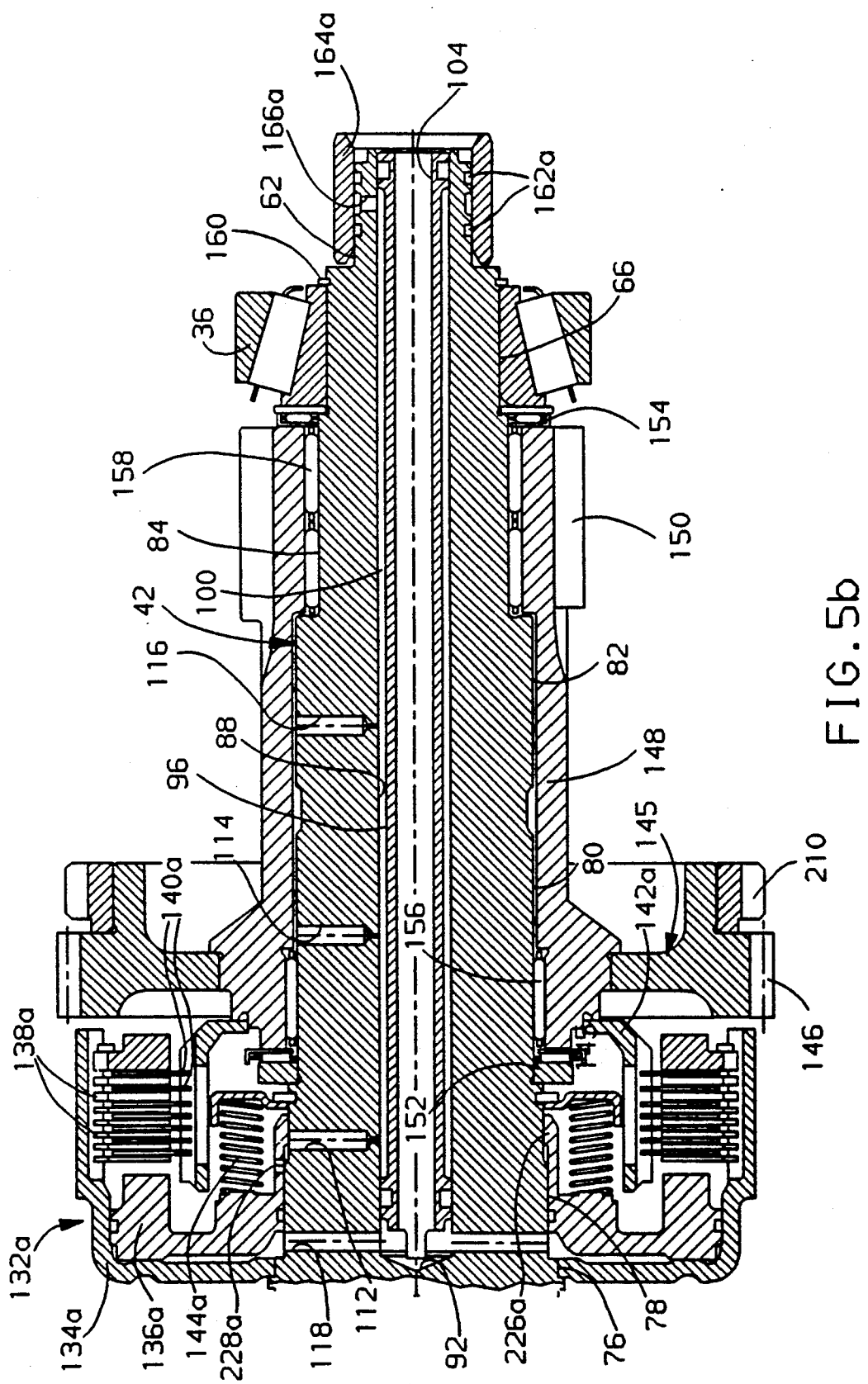
Figure 8:
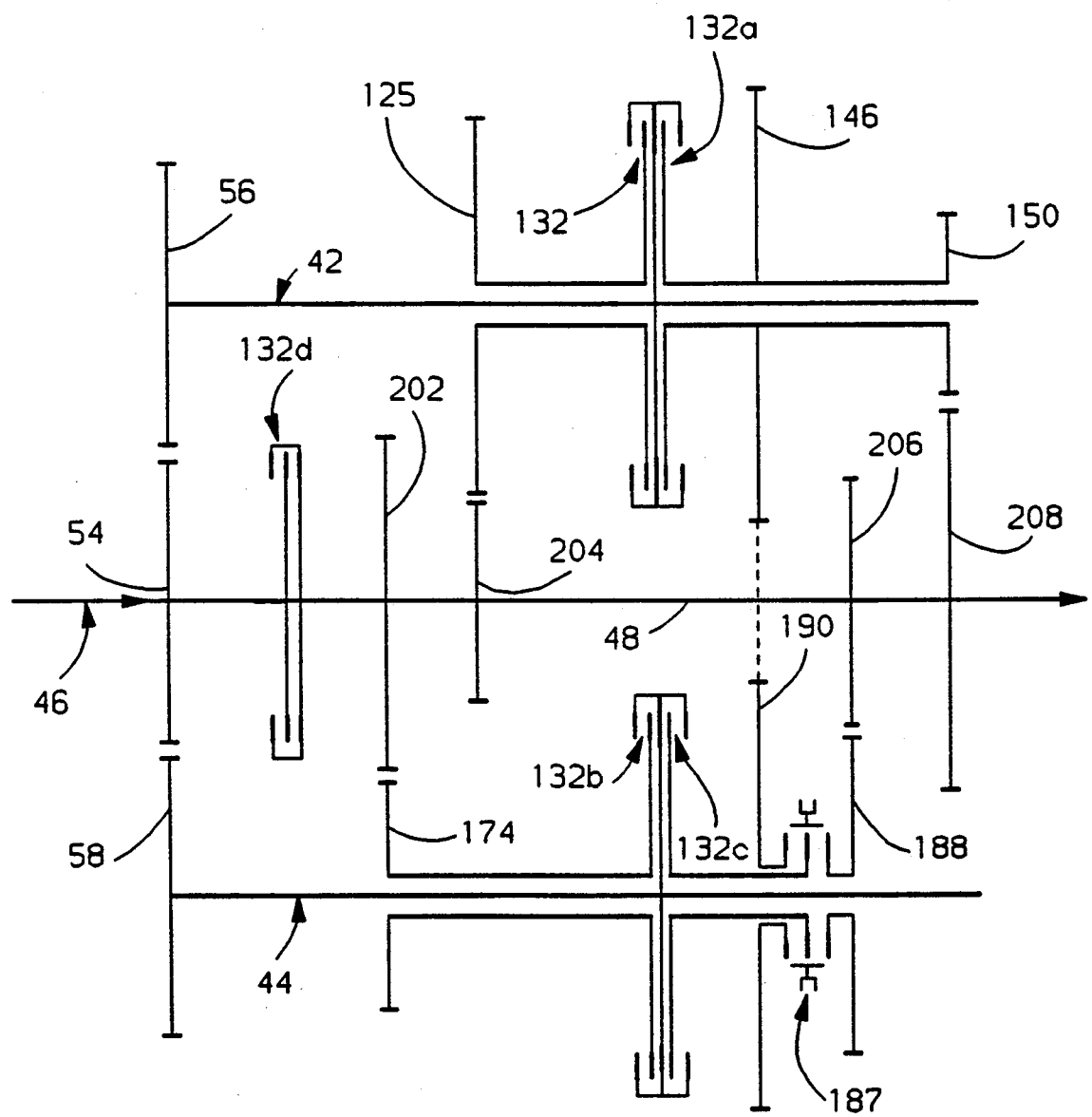
FIG. 8 is a schematic representation of a transmission incorporating the present invention.

The shafts 42 and 44 are dimensionally identical from end-to-end, however, their assembly structure is considerably different as seen in FIGS. 2a through 2d. The assembly of shaft 42 is shown in FIGS. 5a and 5b. In FIG. 5a, it can be seen that the shaft 42 has reduced diameter ends 60 and 62 and a pair of bearing surfaces 64 and 66 adjacent the reduced diameter ends 60 and 62, respectively.

Looking along the shaft from end 60 toward end 62, the outer surface of shafts 42 has a spline portion 68, a constant diameter portion 70, a slightly larger diameter portion 72, a piston mounting surface or diameter 74, a central clutch housing support surface 76, a piston mounting surface 78, a pair of constant diameter surfaces 80 and 82, and a reduced diameter surface 84 adjacent the bearing surface 66. The shaft 44 has an identical structure and the corresponding surfaces are given the same numerical designation with an "a" suffix.

The shaft 42 has a pair of longitudinal passages 86 and 88 that extend inwardly from the ends 60 and 62, respectively, and terminate at 90 and 92, respectively, aligned with the clutch housing support surface 76. Each passage 86 and 88 has disposed therein tubes 94 and 96, respectively, which cooperate with the respective passages 86 and 88 to form a pair of annular lube passages 98 and 100, and have formed therein a respective clutch feed passage 102 and 104. The annular passage 98 has a pair of radially extending fluid passages 106 and 108 which communicate with the diameter surfaces 72 and 74, respectively. A radial passage 110 communicates fluid from the passage 102 to a position on diameter 74 adjacent surface 76. The annular passage 100 has communicating therewith three passages 112, 114 and 116 which are effective to communicate fluid with the surfaces 78, 80 and 82, respectively. A radial passage 118 provides fluid communication from passage 104 to the surface 78 adjacent the surface 76.

As will become more apparent in the following description, the passages 106, 108, 112, 114 and 116 provide cooling and/or lubrication fluid for various gear members and clutch assemblies which are disposed on the shaft 42 while the passages 110 and 118 are effective to distribute clutch engagement pressure to clutch assemblies disposed on the shaft 42. The shaft 44 has identical passages and tube assemblies secured thereto. These corresponding components have been given the same numerical designation with an "a" suffix.

The head gear 56 is splined to the surface 68 in abutment with the bearing 30 which is positioned on the shaft 42 by a locking ring 120. Adjacent head gear 56 is a spacer sleeve 122 which is disposed in abutment with the gear 56 and a thrust bearing assembly 124. The thrust bearing assembly 124 is in abutment with a ratio gear member 125 which is rotatably supported on the shaft 42 by needle bearings 126. The gear 125 is in abutment with a thrust bearing 128 which is positioned by a shoulder 130 formed adjacent the surface 72.

A clutch assembly 132 is disposed on the shaft 42 and includes an annular housing 134 which is welded or otherwise secured to the shaft 42, an annular piston 136 which is slidably disposed in the housing 134 and on the shaft 42, a plurality of friction plates 138 and 140 which are alternately splined to the housing 134 and an output hub 142, respectively.

The output hub 142 is welded or otherwise secured to the gear 125. A return spring assembly 144 is effective to urge the piston 136 rightward as viewed in FIG. 5a to a disengaged position. When fluid pressure is supplied to passages 102 and 110, the piston 136 will move leftward to cause frictional engagement between the alternately spaced friction plates 138 and 140, whereby the gear 125 will be drivingly connected to the shaft 42.

A second clutch assembly 132a is secured to the shaft 42 adjacent the clutch assembly 132 and is a mirror image thereof. The corresponding components of clutch 132a are given the same numerical designation as the components in clutch 132 with an "a" suffix.

The output hub 142a is secured to a gear assembly 145 which includes a reverse gear 146, a sleeve 148 and a ratio gear member 150. The gear assembly 145 is positioned on the shaft 42 by a pair of thrust bearings 152 and 154 and is rotatably supported on the shaft 42 by needle bearings 156 and 158. The thrust bearing 154 is disposed in abutment with the bearing 36 which is positioned on the shaft 42 by a locking ring 160.

The ends 60 and 62 have formed therein seal grooves 162 which cooperate with a dowel and seal sleeve 164 at end 60 and on a sleeve 164a at end 62. The end 60 has a feed passage 166 which is in communication with the annular lube passage 98 and the end 62 has a fluid passage 166a which is in communication with the annular lube passage 100. The dowel and sleeve 164 is pressfit in the bell housing 14 and has a dowel fit with the end support 10 thereby providing for alignment between the end support 10 and the bell housing 14. The sleeve 164a is pressfit in the end support 16. The bearing support recesses 18 and 20 are held in close tolerance with the bores in the end support for the dowel and sleeve 164 and another dowel and sleeve 164b. Thus, the bearing locations for the input end of the countershafts 42 and 44 and input shaft 46 are closely controlled to the bell housing 14.

The shaft 44 has assembled thereon the bearing 32 and head gear 58. A spacer sleeve 168 is disposed between the head gear 58 and a thrust bearing 170 which cooperates with a thrust bearing 172 to position a ratio gear 174 which is rotatably supported on the shaft 44 by needle bearings 176. The gear 174 is selectively connectible with the shaft 44 through controlled operation of a clutch assembly 132b which is identical in structure with clutch 132 and has an output hub 142b secured to the gear 174. The remaining components of clutch assembly 132b are identical with the components of the clutch 132 and have therefore been given the same numerical designation with a "b" suffix. Adjacent the clutch assembly 132b is a clutch assembly 132c which is a mirror image of clutch assembly 132b and is comprised of components identical with clutch assembly 132 such that the same numerical designates with a "c" suffix are utilized.

The output hub 142c is secured to a sleeve 180 which is positioned on the shaft 44 by a pair of thrust bearings 182 and 184, and rotatably supported by needle bearings 186. The sleeve 180 is splined to a conventional synchronizer assembly 187 which is selectively operable to connect a ratio gear 188 or a reverse gear 190 with the output hub 142c of clutch 132c. Therefore, selective positioning of the synchronizer clutch 187 and actuation of the clutch assembly 132c will establish a drive relationship between shaft 44 and either gear 188 or gear 190. Gear 190 is a member of the reverse gear train and is disposed in meshing relation with the gear 146 which is rotatably supported on shaft 42.

The gear 188 is supported on a needle bearing 192 and is positioned longitudinally by the thrust bearing 184, a thrust bearing 194, a sleeve 196 and the bearing 38. As previously mentioned, the assembly of shaft 44 has components identical with the shaft 42 and these components have been given an "a" suffix. In particular, the tubes 94a and 96a are effective to establish the cooling and lubrication passages and the clutch apply passages for fluid which is to be delivered through the dowel and seal sleeve 164b and a sleeve 164c in a manner similar to that described above for dowel and seal sleeve 164 and the sleeve 164a, respectively.

The head gear 54 has secured thereto a hub member 142d which is a component in a clutch assembly 132d which is identical with the clutch assembly 132. In the alternative, the clutch assembly 132d can be constructed with fewer friction plates 138d and 140d, and the housing 134d can be axially shortened. This has the benefit of reducing the axial length of the transmission. This axial shortening of the clutch 132d results in less torque capacity which is permitted because the engine torque is not increased by the head gear set 54–56 or 54–58 prior to delivery to the clutch 132d. While this clutch would then have to be treated differently in production, the overall material savings and axial length savings may overshadow this drawback. The remaining gear ratios 1, 2, 3, 5 and reverse all have the engine torque increased, as a result of the respective head gear sets, prior to delivery to the respective clutches which establish these ratios. The remaining components 132d have been given the same numerical designation as the corresponding components of clutch 132. The housing 134d of clutch 132d is secured to the output shaft 48 such that selective engagement of the clutch 132d, by fluid pressure in a passage 200, will enforce a direct drive connection between the input shaft 46 and the output shaft 48. The output shaft 48 has splined thereto a plurality of ratio gear members 202, 204, 206 and 208 which are in constant mesh with respective gears 174 on shaft 44, and gear 150 on shaft 42. The gear set 150 and 208 will provide a low forward gear ratio between the input shaft 46 and the output shaft 48 upon selective engagement of the clutch 132a.

Second gear operation is provided by gears 174 and 202 upon selective engagement of clutch assembly 132b. A third forward gear ratio is provided by rightward selection of the synchronizer assembly 187 and selective engagement of the clutch assembly 132c. A fourth forward gear ratio is provided by selective engagement of clutch assembly 132d as described above. This is a direct drive ratio. A fifth and overdrive forward gear ratio is provided by selective engagement of the clutch assembly 132. Quite obviously, only one friction clutch assembly 132 through 132d can be engaged at any one time. The selective engagement of these clutches and their interchange can be controlled by many of the currently available and well known hydraulic control circuits.

To establish a reverse drive ratio in the transmission, the synchronizer 187 is established in its leftward position and the clutch 132c is selectively engaged. With this power flow path engaged, power flow is from the input shaft 46 through head gears 54, 58, shaft 44, gears 190 and 146, and gears 150 and 208 and head gear set 54–58 to the output shaft 48. The gears 146 and 190 provide for reversing of the rotational direction during a reverse ratio. The meshing gears 150, 208 and head gear set 54–58 establish the speed ratio of the reverse gear ratio which is identical with the low forward gear ratio. Since the gear reversing or reverse idling function is provided by gears 146 and 190, a separate idler gear axis is not required with the present invention.

A park gear 210 is secured to the gear 146 and therefore is connectible with the output shaft 48 through the low forward ratio of gears 150 and 208. A conventional parking pawl mechanism can be utilized to engage the park gear 210 such that a mechanical advantage is gained between the park gear 210 and the output shaft 48. This advantage is equal to the ratio of the low forward ratio gear set 150, 208 without benefit of the head gear set 54–56.

During assembly of the transmission, the positioning of the countershafts 42 and 44 and the output shaft 48 is controlled by cam shim pack assemblies 212, 214 and 216, respectively. These cam shim packs are identical in structure and include an inner cam ring 218, an outer cam ring 220 and a locking ring 222. The locking ring 222 prevents rearward axial displacement of the outer cam ring 220 relative to the housing 12. The inner cam ring 218 is nonrotatably supported in the housing 12 by a plurality of radially extending tabs 224. The inner cam ring 218 is disposed in abutment with bearings 36, 40 and 38, respectively, for each of the shim packs.

During assembly, the outer cam ring 220 is rotated relative to the inner cam ring 218 thereby causing relative axial movement between the outer casing 12 and the inner cam ring 218 to enforce longitudinal positioning of the countershafts 42 and 44 and the output shaft 48 through the respective bearing assemblies which support the shafts in the housing 12. A tabbed washer 225 is connected at the outer diameter with the housing 12, and the inner diameter of the washer 225 is displaceable into an opening 227 in the outer cam ring 220 to prevent movement between the cam rings 218, 220 after assembly. The adjustment mechanisms can be constructed in accordance with the bearing adjustment mechanism shown in U.S. Pat. No. 3,901,568 Gadd et.al., issued Aug. 26, 1975, and assigned to the assignee of the present invention.

The shafts 42, 44, 46 and 48 and their respective components, can be assemblies onto the end support 10 as the end support is vertically positioned on an assembly line or bell housing 14. This assembly can be competed with the outer casing 12 having been installed over the gear assemblies. Thus, as the transmission assembly progresses along the assembly line, continuous visual inspection is available to ensure that proper gear positioning and gear meshing is occurring.

The outer casing 12 can then be installed over the transmission assembly and secured to the bell housing 14 or in the alternative, to the end support. When this assembly is completed, the adjustment mechanisms 212, 214 and 216 are manipulated to ensure proper placement of the shaft assemblies and then the end cover 16 can be positioned and secured to the outer casing 12.

It should be noted that the end support 16 and bell housing 14 are both aligned with the shafts 42 and 44 through the dowel and seal sleeve components 164 through 164c. This eliminates the need for additional dowel locations being machined through the various components which would have to rely on some dimensional location on the end support 10 and housing 12 for proper alignment. The commonalty of the shafts 42 and 44 greatly reduce the inventory and machining requirements for these components. Further, material savings are established through the use of the common clutch assemblies. The savings are occasioned not only by the reduction in the number of different components to be utilized, but also in the fact that the likelihood of misassembly of the clutches is greatly reduced.

Each piston 136 through 136d has an inner skirt portion 226 which is slidably disposed on the respective portions of the shafts 42, 44 and 48. The skirt 226 partially or completely covers the respective lube and cooling passage, such as 108, for clutch 132 when the clutch is disengaged. During movement of the piston 136 to engage the clutch, an opening 228 in the skirt 226 will be placed in fluid communication with the respective lube passage thereby permitting unrestricted fluid flow from the annular fluid passage 98 to the alternately spaced friction plates 138 and 140. This permits controlled cooling flow during clutch engagement when it is desirable to have such clutch engagement flow but limits or eliminates fluid flow in this circuit when the clutches are disengaged. With the reduced cooling flow requirements, the system flow requirements are also reduced which makes more fluid available for lubrication circuits and reduces the volume of the control pump required to supply the fluid to the control system.

It should be noted that the arrangement of the seals, clutch feed passages and lube passages minimize oil leakage and, the oil leakage that may occur from the clutch feed is directed to the lube circuit. This feature contributes to a reduction in the required volume of the supply pump. Also, as pointed out previously, the extended skirts on the clutch piston also contribute to a reduced pump requirement by reducing the amount of continuous oil flow to the system.

A further savings in material and inventories is also provided through the use of commonalty between various thrust bearings and needle bearings which are components within the transmission assembly.

It should further be appreciated that wide latitude is permitted in the selection of the various gear ratios and that the changing of the gear ratios after assembly can be accomplished without significant changes in the other components of the transmission. One other advantage of the present invention is the provision for identical low and reverse drive ratios.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A transmission comprising: a housing having first and second end covers; an input shaft rotatably mounted in the first end cover; an output shaft rotatably supported on the input shaft and in said second end cover; first and second countershafts rotatably supported in said end covers for rotation on respective axis parallel with said input shaft and said output shaft; a first head gear continuously rotatable with said input shaft; second and third head gears meshing with said first head gear and continuously rotatable with the first and second countershafts respectively; a plurality of ratio gears rotatably supported on each of said countershafts including a first ratio gear on said first countershaft and a second ratio gear on said second countershaft; reverse gear means including a first member rotatable with said first ratio gear and a second member rotatably supported on said second countershaft; synchronizer clutch means selectively and alternatively connectible with said second ratio gear and said second member of said reverse gear means; output gear means drivingly connected with said output shaft and including a first ratio output gear meshing with said first ratio gear and a second ratio output gear meshing with said second ratio gear; first selectively engageable friction clutch means for connecting said first ratio gear with said first countershaft for completing a low forward drive ratio between said input and output shafts; and second selectively engageable friction clutch means for selectively connecting said synchronizer clutch means to said second countershaft and cooperating therewith to selectively alternatively complete a reverse drive ratio between said input shaft and said output shaft and another forward drive ratio between said input and output shafts, said reverse drive ratio being transmitted to said output shaft through said first ratio gear and said first ratio output gear.

2. A transmission comprising: a housing having a casing, a first end support and a second end support; an input shaft rotatably mounted in the first end support; an output shaft rotatably supported on the input shaft and in said casing; first and second countershafts rotatably supported in one of said end supports and in said casing for rotation on respective axis parallel with said input shaft and said output shaft; a first head gear continuously rotatable with said input shaft; second and third head gears meshing with said first head gear and continuously rotatable with the first and second countershafts respectively; a plurality of ratio gears rotatably supported on each of said countershafts including a first ratio gear on said first countershaft and a second ratio gear on said second countershaft; reverse gear means including a first member rotatable with said first ratio gear and a second member rotatably supported on said second countershaft; synchronizer clutch means selectively and alternatively connectible with said second ratio gear and said second member of said reverse gear means; output gear means drivingly connected with said output shaft and including a first ratio output gear meshing with said first ratio gear and a second ratio output gear meshing with said second ratio gear; first selectively engageable friction clutch means for connecting said first ratio gear with said first countershaft for completing a low forward drive ratio between said input and output shafts; and second selectively engageable friction clutch means for selectively connecting said synchronizer clutch means to said second countershaft and cooperating therewith to selectively alternatively complete a reverse drive ratio between said input shaft and said output shaft and another forward drive ratio between said input and output shafts, said reverse drive ratio being transmitted to said output shaft through said first ratio gear and said first ratio output gear.

3. The invention defined in claim 2 wherein said transmission further comprises a toothed parking pawl means secured to one of said first member and second member of said reverse gear means for providing a park securement having a torque ratio greater than one with said output shaft.

* * * * *